Patented Apr. 18, 1933

1,904,244

UNITED STATES PATENT OFFICE

MAX LANDECKER, OF BARMEN, GERMANY

PLASTIC MASS AND PROCESS FOR MAKING SAME

No Drawing. Application filed July 11, 1929, Serial No. 377,590, and in Germany June 11, 1928.

This invention relates to plastic masses, and a process for preparing same.

It is an object of this invention to prepare from a non-protein source plastic masses which resemble in their chemical properties plastic masses of natural albumen but which are superior thereto.

A large number of patents describe the condensation of urea and formaldehyde for the manufacture of transparent and opaque masses, but the practical results in the manufacture of these compounds, especially of the translucent ones, have been discouraging until now. The molded or cast articles crack into pieces, especially when exposed to sunlight or treated with hot water.

I have found that articles which will not crack and which have very resistant qualities can be obtained from condensation products of urea and formaldehyde, if the latter is partially or totally combined with sulphur molecules.

As a specific example of an embodiment of my invention I may take 100 grams of solid urea, and pour over it a solution containing 20 grams of ammonium sulfide. The urea dissolves very quickly in this solution. I may then add 250 c. c. of commercial 40% formalin. Within a very short time, a sulphur-like clouding appears in the solution. This clouding disappears after some minutes standing or may be more quickly removed by heating the solution, leaving a clear, colorless liquid. This liquid is capable of combining with more ammonium sulphide. The yellow tint of the added sulphide instantly disappears if it is poured into the warmed condensation liquid. The milky clouds which form at the moment of addition disappear after shaking and the liquid becomes clear and colorless again. After heating the liquid to its boiling point a continuous and uniform reaction takes place which proceeds after removal from the heating source until the liquid has changed from a water like condition through a syrup consistency to a colorless, glass like jelly. Upon further evaporation a milky cloudiness appears in the mass. It subsequently becomes opaque, and finally changes to an absolutely clear, highly refractive solid mass. This mass can be hardened by slow heating.

Other examples of my invention are as follows:

100 grams of urea, 250 c. c. of formalin, 20 c. c. of formic acid are mixed and a solution containing 30 grams of ammonium sulphide is poured in. No trace of formaldehyde escapes, the liquid becomes cloudy but clears up after standing for a time or heating. After heating to 80° C., a reaction takes place without further heating and the liquid solidifies quickly to a clear jelly.

The same results occur, if ammonium disulphide is mixed with the solution of urea and formaldehyde first and then the acid is added.

250 c. c. of formalin, 100 grams of urea, and a solution containing 20 grams of ammonium disulphide are mixed and heated. After boiling for 28 minutes the liquid solidifies to a clear jelly.

100 grams of urea are dissolved in 400 c. c. of formalin and 250 grams of ammonium sulphide dissolved in water are added. A precipitate appears but disappears after some minutes boiling. To this hot solution 100 grams more of ammonium sulphide are added and the solution is boiled again. After some boiling thick flocks of a greenish precipitate appears in the liquid, which become dissolved again, when the liquid changes into a syrup like state. The clear syrup solidifies in cooling to a clear jelly. The syrup is poured into water precipitates white, soft flocks, which only partially dissolve in boiling water.

250 c. c. of formalin are mixed with a solution of 60 grams of ammonium sulphide, whereby a milky precipitate appears. 100 grams of urea are added and then 4 c. c. of acid are poured in and heated. The precipitate dissolves and the liquid stands clear after 17 minutes boiling; after 18 minutes boiling a small white cloud precipitates again and the liquid gelatinizes after 19 minutes boiling to a milky looking jelly. The articles pressed from this product resemble natural horn.

100 grams of urea, 250 c. c. of formalin and 100 grams of sodiumthiosulphate are mixed and formic acid added, until the mixture shows acid reaction. After 1 minute boiling the liquid reacts violently, forming a skin on the surface. In spite of this skin the liquid evaporates almost completely, before the reaction product gelatinizes. The milky jelly can be cast or molded in ivorylike articles.

100 grams of urea, 250 c. c. of formalin, 40 grams of sodium disulphide dissolved in water, and 50 grams of sodiumthiosulphate are mixed and dissolved. 2 c. c. of lactic acid (80%) are added. The yellowish solution starts to clear up to a colorless, milky liquid, which changes into clear liquid after short boiling. A violent reaction then forms a clear jelly.

250 c. c. of formalin are mixed with 70 c. c. of hydrochloric acid and 100 grams of ferrous sulphide. Then 100 grams of urea are added and the mixture heated. The ferrous sulphide starts to dissolve in the liquid, with scarcely any smell of hydrogen sulphide. A vigorous reaction starts after boiling and shortly after the liquid solidifies to a clear jelly.

The absorption power of urea-formalin mixtures for sulphur is suprisingly high. Thus, for example, an acidified solution of urea may be permitted to flow into the solution of formaldehyde containing ammonium sulphide. Even under these conditions no hydrogen sulphide escapes but the reaction above described takes place.

The liquid product may be poured into molds and hardened by heating. Also the product may be ground to a powder and then molded by heat and pressure by the methods commonly used with resins or albuminous products. This may be done either in the dry or moist condition. Fillers or coloring matter of any type may be incorporated in the mass in the usual manner.

The properties of the substance so prepared are, as I have previously stated, very similar to those of the natural albumens, glue, egg albumen or the like. For example, the condensation product gives with reagents many of the precipitation reactions of albumens; e. g., with tannin, picric acid, potassium ferrocyanide, and heavy metal salts. It also shows the lead sulphide reaction in alkaline solution. If a lead salt be added there results a light yellow precipitate which, upon heating quickly passes through changes in color from blue-purple, light brown, dark red-brown into the blackish-brown lead sulphide. Furthermore, on burning, the substance gives an odor of burnt horn.

My product as I have stated can be made as clear as glass but may also be made semi-transparent and opaque. It has further the advantageous property of being resistant to cracking, which property is doubtless due to the stability imparted by the sulphur. The stability of the finished products when hardened by heat, against water, dilute acid and alkaline solutions is as superior to that of natural horn, as that of the artificial resins is superior to that of the natural resins.

The behavior of articles made from my product toward hot liquids is also much superior to that of products made from natural albumens, but they do not attain quite the stability against hot acids as do articles molded from synthetic resins. The resistance of my product to dry heat is also much better than that of natural albumen products and is equal to that of the synthetic resins.

While I have given specific examples of the method of carrying out my invention it is to be understood that I do not limit myself thereto. Many changes can be made, all of which are intended to be included within my invention. Instead of urea I may, of course, use homologues thereof, or such compounds as thiourea or its derivatives, or the metal compounds or salts and complex salts of these compounds. The term "urea" as used in the appended claims is intended to include such homologues and derivatives of urea. Instead of formaldehyde other aldehydes may be substituted.

Other sulphur compounds than those mentioned above may be used to introduce sulphur into the reaction. The sulphur compound used must contain sulphur in a form similar to that in which sulphur is present in the ordinary metallic sulphides, that is to say, in such form that hydrogen sulphide or free sulphur will be liberated upon acidification.

Those skilled in the art will see other possible modifications, so that I do not wish to be limited by this description but only by the prior art and the appended claims.

I claim:

1. A process for preparing plastic masses, comprising reacting urea with the reaction products of an aldehyde and a sulphide capable of liberating hydrogen sulphide or free sulphur upon acidification.

2. A process for preparing plastic masses, comprising reacting urea with the reaction products of an aldehyde and a sulphide capable of liberating hydrogen sulphide or free sulphur upon acidification, and evaporating off excess moisture.

3. A process for preparing plastic masses, comprising reacting urea with the reaction products of an aldehyde and a sulphide capable of liberating hydrogen sulphide or free sulphur upon acidification, evaporating off excess moisture, and hardening the resulting product by means of heat.

4. A process for preparing plastic masses, comprising reacting urea and an aldehyde with a sulphide capable of liberating hydrogen sulphide or free sulphur upon acidification.

5. A process for preparing plastic masses, comprising reacting urea and an aldehyde with a sulphide capable of liberating hydrogen sulphide or free sulphur upon acidification, and evaporating off excess moisture.

6. A plastic composition comprising essentially a product of the condensation of urea with the reaction products of formaldehyde and an inorganic sulphide.

7. A plastic composition comprising essentially a reaction product of urea, an aldehyde and a sulphide capable of liberating hydrogen sulphide or free sulphur upon acidification.

8. A plastic composition comprising essentially a reaction product of urea, an aldehyde and an inorganic sulphide.

In testimony whereof, I have signed my name to this specification this 16th day of May, 1929.

MAX LANDECKER.